United States Patent
Stricklin et al.

(10) Patent No.: US 7,466,714 B2
(45) Date of Patent: Dec. 16, 2008

(54) METHODS, SYSTEMS, AND COMPUTER PROGRAM PRODUCTS FOR OPERATING A COMMUNICATION NETWORK BY DIVIDING THE NETWORK INTO MULTIPLE ZONES AND DEFINING POLICIES THAT SPECIFY ALLOWABLE COMMUNICATIONS BETWEEN THE ZONES

(75) Inventors: Randy Stricklin, Stone Mountain, GA (US); Troy Meuninck, Sharpsburg, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 707 days.

(21) Appl. No.: 11/006,870

(22) Filed: Dec. 8, 2004

(65) Prior Publication Data

US 2006/0120304 A1   Jun. 8, 2006

(51) Int. Cl.
*H04L 12/56* (2006.01)
*H04L 12/66* (2006.01)

(52) U.S. Cl. ....................... 370/401; 709/230
(58) Field of Classification Search ............. None
See application file for complete search history.

(56) References Cited

U.S. PATENT DOCUMENTS

| 7,133,511 B2* | 11/2006 | Buntin et al. | 379/189 |
| 7,151,781 B2* | 12/2006 | MeLampy et al. | 370/468 |
| 2004/0008668 A1* | 1/2004 | Droz | 370/352 |
| 2004/0184446 A1* | 9/2004 | Havens | 370/352 |
| 2005/0286496 A1* | 12/2005 | Malhotra et al. | 370/352 |
| 2006/0117381 A1* | 6/2006 | Sylvain | 726/8 |

\* cited by examiner

*Primary Examiner*—Gregory B Sefcheck
(74) *Attorney, Agent, or Firm*—Myers Bigel Sibley & Sajovec, P.A.

(57) ABSTRACT

A communication network is operated by logically dividing the communication network into a plurality of zones. Policies are specified that define allowable communications between elements in different ones of the plurality of zones. Communications are blocked between elements in different ones of the plurality of zones that violate at least one of the policies.

12 Claims, 4 Drawing Sheets

METHODS, SYSTEMS, AND COMPUTER PROGRAM PRODUCTS FOR OPERATING A COMMUNICATION NETWORK BY DIVIDING THE NETWORK INTO MULTIPLE ZONES AND DEFINING POLICIES THAT SPECIFY ALLOWABLE COMMUNICATIONS BETWEEN THE ZONES

FIELD OF THE INVENTION

The present invention relates to communication networks, and, more particularly, to methods, systems, and computer program products for providing security in communication networks.

BACKGROUND OF THE INVENTION

The Internet has become a mainstream network for communicating not just data, such as email and pictures, but also for providing real-time bi-directional voice communications. Voice over Internet Protocol (VoIP) is an industry standard that has evolved to enable users to place phone calls through the Internet, instead of through the Public Switched Telephone Network (PSTN). A conventional phone may now be connected to the Internet using an interface device that converts analog phone signals to digital signals that can be communicated through the Internet. A phone call may thereby be communicated through the Internet to a VoIP provider, who converts the call back to an analog signal and places the call through a PSTN that is local to the called phone. A user can thereby dial a telephone number in a conventional manner and have the call routed through the Internet, instead of through a PSTN.

Unfortunately, a VoIP architecture has an inherent vulnerability of being directly connected to the Internet. Current VoIP architectures and firewall configurations may not provide a sufficient level of security. For example, conventional VoIP architectures may lack discretely defined control and data zones, where a zone is a group of devices that share a similar function or required level of protection. Ingress/egress to other zones may be regulated/monitored by a network security device, such as a firewall. Conventional VoIP architectures may also lack a clearly defined set of rules for governing interaction between zones to ensure a secure exchange of control and data messages. In addition, conventional VoIP architectures may not consistently adhere to VoIP control logic standards when implementing VoIP protocols relating to control, setup, and data exchange between discrete VoIP elements, e.g., softswitch, media gateways, proxies, etc. Accordingly, there exists a need for improved network architectures that may provide improved security.

SUMMARY OF THE INVENTION

According to some embodiments of the present invention, a communication network is operated by logically dividing the communication network into a plurality of zones. Policies are specified that define allowable communications between elements in different ones of the plurality of zones. Communications are blocked between elements in different ones of the plurality of zones that violate at least one of the policies.

In other embodiments of the present invention, the communication network comprises a voice over Internet Protocol (VOIP) network.

In still other embodiments of the present invention, a protocol to be used for communication between elements in different ones of the plurality of zones is specified.

In still other embodiments of the present invention, any zones to which an element may redirect a communication are specified if the protocol is a Media Gateway Control Protocol (MGCP) or a Session Initiation Protocol (SIP).

In still other embodiments of the present invention, the plurality of zones comprises an inter-provider zone, a phone registration/management zone, a call feature zone, a media gateway zone, and an Internet/customer network zone.

In still other embodiments of the present invention, policies are specified to allow direct communications between elements in the phone registration/management zone and the call feature zone, inter-provider zone, and Internet/customer network zone. Policies are also specified to allow direct communications between elements in the inter-provider zone and the call feature zone and the media gateway zone.

In still other embodiments of the present invention, policies are specified to allow redirection to the media gateway zone on communications from the inter-provider zone to the phone registration/management zone. Policies may also be specified to allow redirection to the Internet/customer network zone and/or the call feature zone on communications from the phone registration/management zone to the inter-provider zone. Policies may also be specified to allow redirection to the Internet/customer network zone, media gateway zone, and/or call feature zone on communications from the phone registration/management zone to the Internet/customer network zone. Policies may also be specified to allow redirection to the Internet/customer network zone on communications from the Internet/customer network zone to the phone registration/management zone. Policies may also be specified to allow redirection to the Internet/customer network zone and/or media gateway zone on communications from the phone registration/management zone to the call feature zone. Policies may also be specified to allow redirection to the call feature zone on communications from the call feature zone to the phone registration/management zone. Policies may also be specified to allow redirection to the call feature zone on communications from the call feature zone to the inter-provider zone. Policies may also be specified to allow redirection to the media gateway zone on communications from the inter-provider zone to the call feature zone. Policies may also be specified to allow redirection to the Internet/customer network zone and/or the call feature zone on communications from the inter-provider zone to the media gateway zone. And policies may also be specified to allow redirection to the media gateway zone on communications from the media gateway zone to the inter-provider zone.

In still other embodiments of the present invention, a network security device may be located in the communication network based on the logical division of the communication network and the policies that define allowable communications between elements in different ones of the plurality of zones.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EXEMPLARY EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. As used herein, the term "and/or" includes any and all combinations of one or more of the associated listed items.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

For purposes of illustration, embodiments of the present invention are described herein with respect to a voice over Internet Protocol (VoIP) network and methods of operating the same so as to provide improved security thereon. It will be understood, however, that the present invention is not limited to such embodiments but may also be embodied in other types of communication networks.

Figure 1:
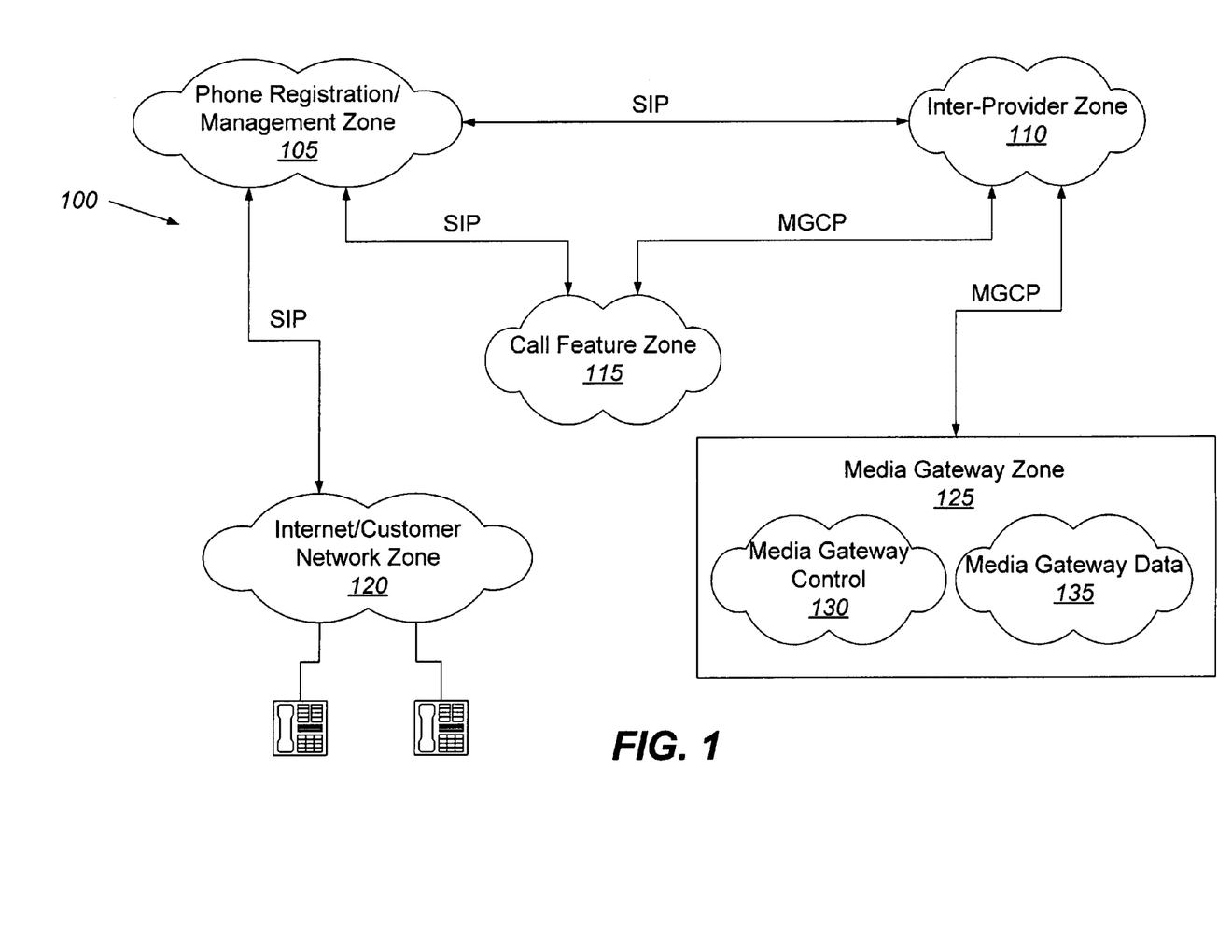
FIG. 1 is a block diagram that illustrates zone division and allowable communications between zones in a communication network in accordance with some embodiments of the present invention.

Referring now to FIG. 1, an exemplary VoIP communication network architecture 100, in accordance with some embodiments of the present invention, will now be described. The VoIP network 100 is divided into a plurality of zones in which devices that share a similar function or a common level of security protection are grouped together. As shown in FIG. 1, the VoIP network 100 includes a phone registration/management zone 105, an inter-provider zone 110, a call feature zone 115, an Internet/customer network zone 120, and a media gateway zone 125. The media gateway zone 125 may optionally include a media gateway control zone 130 and a media gateway data zone 135 in accordance with some embodiments of the present invention.

The Internet/customer network zone 120 may be configured to provide an interface for customers to use IP phones to make voice calls. The phone registration/management zone 105 may be configured with one or more servers to provide an interface between the customers' VoIP handsets and the VoIP network 100. The inter-provider zone 110 may be configured to include a VoIP softswitch, out-of-band signaling elements (e.g., signaling system seven (SS7) elements), and/or public switched telephone network (PSTN) elements. The media gateway zone 125 may be configured to include a trunk gateway for access to the PSTN, for example. As shown in FIG. 1, the media gateway zone 125 may be. further divided into a media gateway control zone 130 and a media gateway data zone 135 to separate control and data elements in the trunk gateway. The call feature zone 115 may be configured to include one or more servers to provide various calling features, such as voice mail, for example.

In addition to dividing the VoIP communication network 100 into multiple zones, policies are specified that define allowable communications between elements in the various zones. These policies may include a set of rules and/or practices that specify or regulate how the VoIP network 100 provides security services to protect resources therein. For example, elements in the phone registration/management zone 105 and elements in the inter-provider zone 110 may communicate directly with one another using, for example, the session initiation protocol (SIP). SIP is an application layer signaling protocol for VoIP implementations that use the redirect mode. Elements in the phone registration/management zone 105 and elements in the Internet/customer network zone 120 may communicate directly with one another using SIP. Also, elements in the phone registration/management zone 105 and elements in the call feature zone 115 may communicate directly with one another using SIP. Elements in the inter-provider zone 110 and elements in the call feature zone 115 may communicate directly with one another using the Media Gateway Control Protocol (MGCP), which is a VoIP protocol that is used to control telephony gateways from external call control elements called media gateway controllers or call agents. Also, elements in the inter-provider zone 110 may communicate directly with elements in the media gateway zone 125 using MGCP. As used herein, when an element in one zone is said to be able to communicate directly with an element in another zone, the term "directly" means that no intervening zones are present in the communication path between the two elements.

Figure 2:
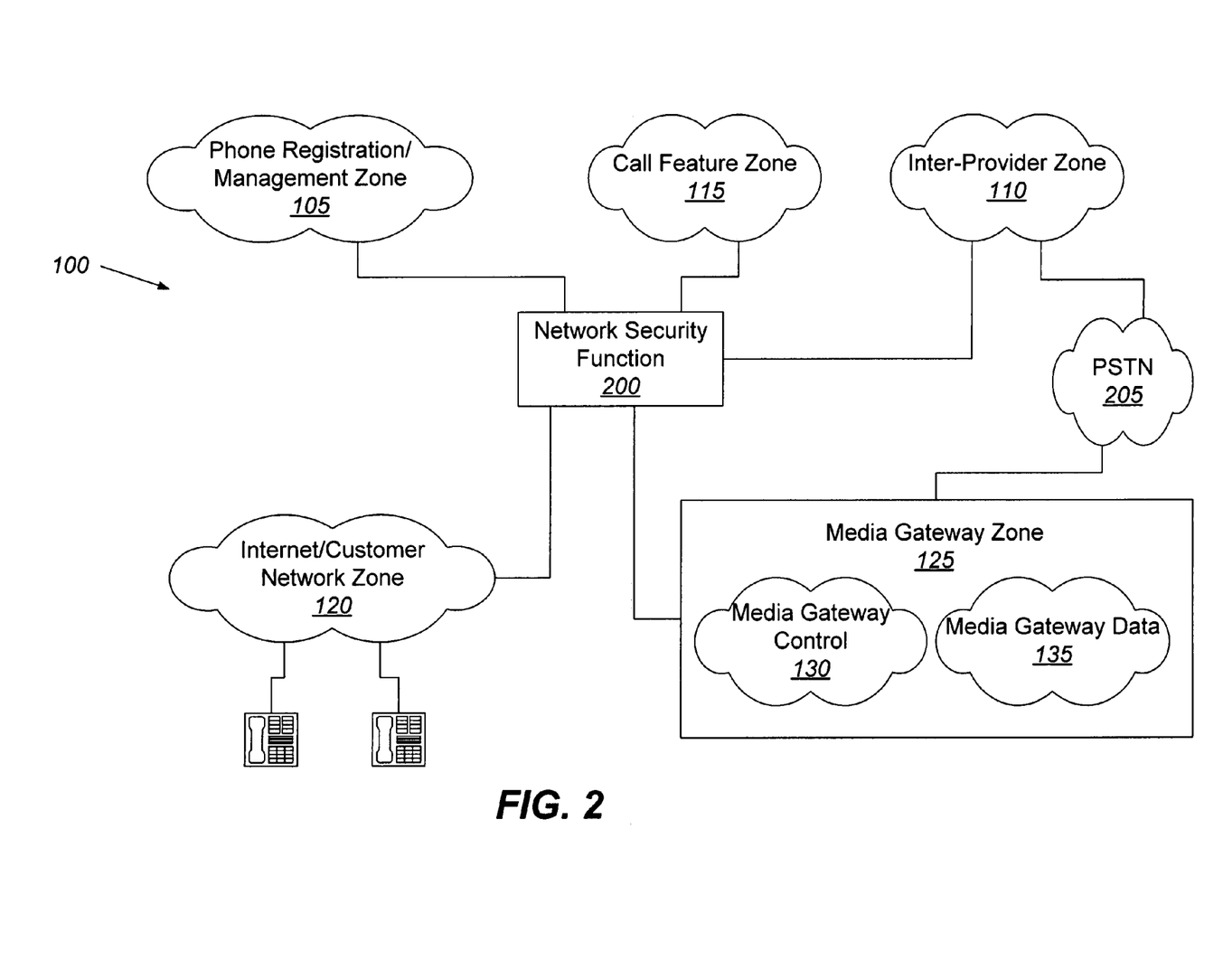
FIG. 2 is a block diagram that illustrates placement of a network security function based on the zone division and allowable communications between zones in a communication network in accordance with some embodiments of the present invention.

Referring now to FIG. 2, the VoIP network 100 may further comprise a network security function 200 in accordance with some embodiments of the present invention. Placement of the network security function 200 among the phone registration/management zone 105, the inter-provider zone 110, the call feature zone 115, the Internet/customer network zone 120, the media gateway zone 125, and the PSTN 205 may be determined based on the logical division of the VoIP communication network 100 and/or the policies that define the allowable communications between elements in the different zones, in accordance with some embodiments of the present invention.

The network security function 200 may be configured to block communications between elements in different zones that violate one or more of the policies defined for the VoIP network 100. Thus, embodiments of the present invention may encourage vendors that provide elements for the VoIP network 100 to ensure that their products strictly adhere to VoIP control logic standards in how their elements communicate/redirect call flows to other vendors' VoIP elements. The network security function 200 monitors communications in the VoIP network for compliance with the standards and may block communications that are found to be non-compliant.

In accordance with various embodiments of the present invention, the network security function 200 may be embodied as one or more data processing systems separately from the various defined zones in the VoIP network 100 or may be incorporated into elements residing in one or more of the network zones.

Exemplary operations for operating a communication network by dividing the network into multiple zones and specifying policies that define allowable communications between elements in the different ones of the multiple zones, in accordance with some embodiments of the present invention, will now be described with reference to FIG. 3. Operations begin at block 300 where the network is logically divided into a plurality of zones, as illustrated, for example, in FIGS. 1 and 2 where the VoIP network 100 is divided into multiple zones. Separate zones are used in the event of a security breach to aid in containing the compromise. This stands in contrast to conventional VoIP networks, for example, in which, in the event that one element is compromised, all other elements may be put at risk because there is no separation (e.g., security protection) between the different classifications of elements. At block 305, polices are specified that define allowable communications between elements in different ones of the plurality of zones. Communications between elements in the different zones that violate one or more of the policies may be blocked at block 310 by the network security function 200 of FIG. 2, for example.

Figure 3:
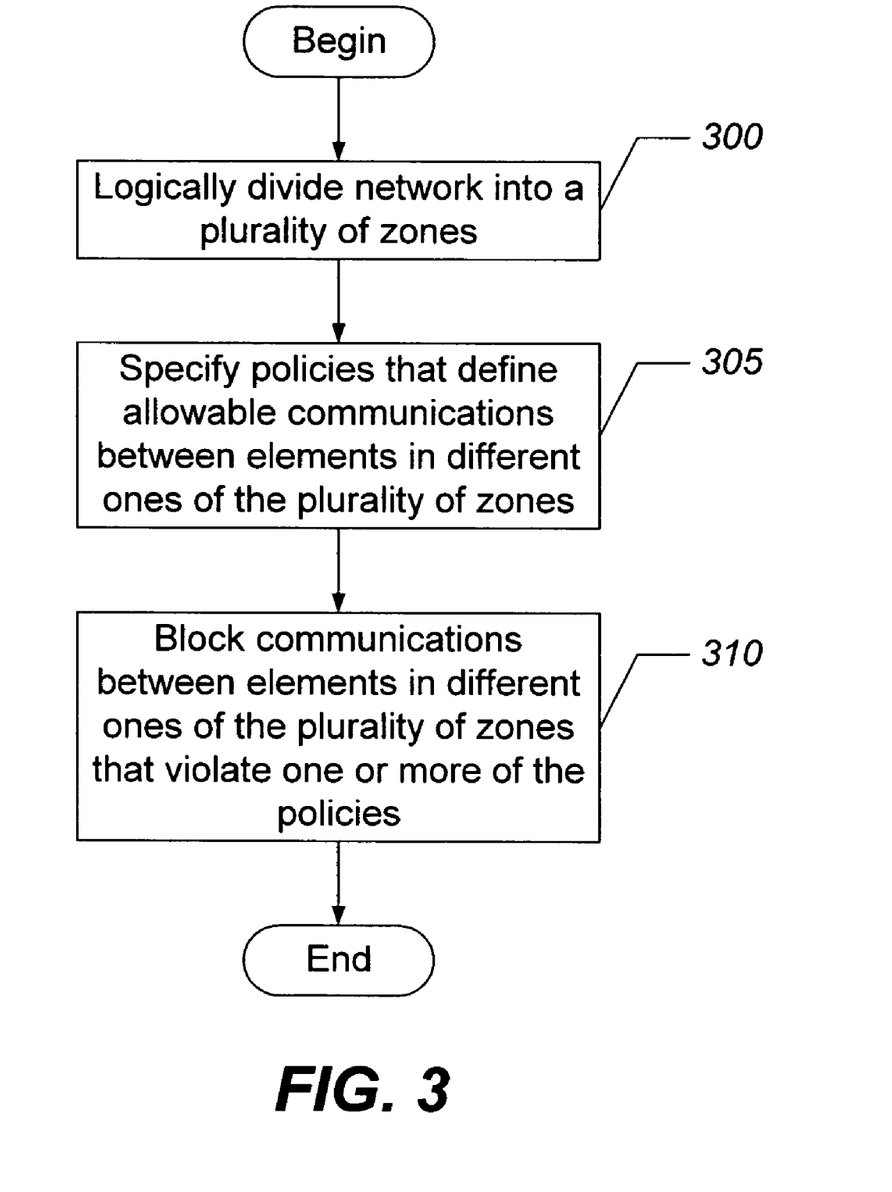
FIGS. 3 and 4 are flowcharts that illustrate methods, systems, and computer program products for operating a communication network by dividing the network into multiple zones and specifying policies that define allowable communications between elements in the different ones of the multiple zones in accordance with some embodiments of the present invention.
Figure 4:
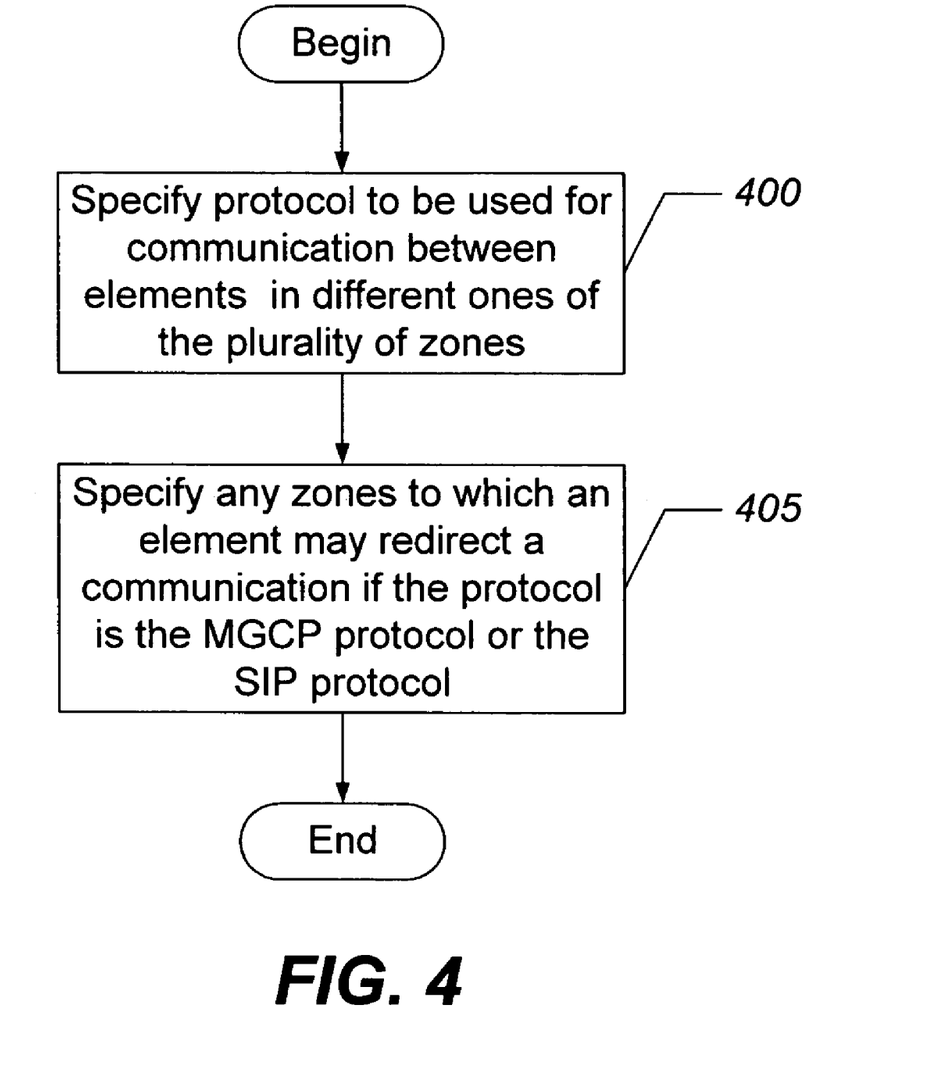

In some embodiments of the present invention illustrated in FIG. 4, the policies specified at block 305 of FIG. 3 may include specification of the protocol to be used for communication between elements in different ones of the plurality of zones at block 400. This is illustrated, for example, in FIG. 1 where the SIP or the MGCP protocol is specified for communication between elements in various ones of the plurality of zones of the VoIP network 100. In addition, at block 405, the policies may further specify any zones to which an element may redirect a communication if the protocol used is the MGCP protocol or the SIP protocol.

For example, in accordance with some embodiments of the present invention policies are specified to allow redirection to the media gateway zone 125 on communications from the inter-provider zone 110 to the phone registration/management zone 105. Policies may also be specified to allow redirection to the Internet/customer network zone 120 and/or the call feature zone 115 on communications from the phone registration/management zone 105 to the inter-provider zone 110. Policies may also be specified to allow redirection to the Internet/customer network zone 120, media gateway zone 125, and/or call feature zone 115 on communications from the phone registration/management zone 105 to the Internet/customer network zone 120. Policies may also be specified to allow redirection to the Internet/customer network zone 120 on communications from the Internet/customer network zone 120 to the phone registration/management zone 105. Policies may also be specified to allow redirection to the Internet/customer network zone 120 and/or media gateway zone 125 on communications from the phone registration/management zone 105 to the call feature zone 115. Policies may also be specified to allow redirection to the call feature zone 115 on communications from the call feature zone 115 to the phone registration/management zone 105. Policies may also be specified to allow redirection to the call feature zone 115 on communications from the call feature zone 115 to the inter-provider zone 110. Policies may also be specified to allow redirection to the media gateway zone 125 on communications from the inter-provider zone 110 to the call feature zone 115. Policies may also be specified to allow redirection to the Internet/customer network zone 120 and/or the call feature zone 115 on communications from the inter-provider zone 110 to the media gateway zone 125. And policies may also be specified to allow redirection to the media gateway zone 125 on communications from the media gateway zone 125 to the inter-provider zone 110.

The flowcharts of FIGS. 3 and 4 illustrate the architecture, functionality, and operations of some embodiments of methods, systems, and computer program products for operating a communication network by dividing the network into multiple zones and specifying policies that define allowable communications between elements in the different ones of the multiple zones, in accordance with some embodiments of the present invention. In this regard, each block represents a module, segment, or portion of code, which comprises one or more executable instructions for implementing the specified logical function(s). It should also be noted that in other implementations, the function(s) noted in the blocks may occur out of the order noted in FIGS. 3 and 4. For example, two blocks shown in succession may, in fact, be executed substantially That which is claimed:

1. A method of operating a voice over Internet Protocol (VoIP) network, comprising:
    logically dividing the (VoIP) network into a plurality of zones;
    specifying policies that define allowable communications between elements in different ones of the plurality of zones; and
    blocking communications between elements in different ones of the plurality of zones that violate at least one of the policies;
    wherein the plurality of zones comprises an inter-provider zone, a phone registration/management zone, a call feature zone, a media gateway zone, and an Internet/customer network zone;
    wherein specifying policies comprises:
        specifying a protocol to be used for communication between elements in the different ones of the plurality of zones; and
        specifying any zones to which an element may redirect a communication if the protocol is a Media Gateway Control Protocol (MGCP) or a Session Initiation Protocol (SIP).

2. The method of claim 1, wherein specifying the policies comprises:
    specifying policies to allow direct communications between elements in the phone registration/management zone and the call feature zone, inter-provider zone, and Internet/customer network zone; and
    specifying policies to allow direct communications between elements in the inter-provider zone and the call feature zone and the media gateway zone.

3. The method of claim 2, wherein specifying the policies comprises:
    specifying policies to allow redirection to the media gateway zone on communications from the inter-provider zone to the phone registration/management zone;
    specifying policies to allow redirection to the Internet/customer network zone and/or the call feature zone on communications from the phone registration/management zone to the inter-provider zone;
    specifying policies to allow redirection to the Internet/customer network zone, media gateway zone, and/or call feature zone on communications from the phone registration/management zone to the Internet/customer network zone;
    specifying policies to allow redirection to the Internet/customer network zone on communications from the Internet/customer network zone to the phone registration/management zone;
    specifying policies to allow redirection to the Internet/customer network zone and/or media gateway zone on communications from the phone registration/management zone to the call feature zone;
    specifying policies to allow redirection to the call feature zone on communications from the call feature zone to the phone registration/management zone;
    specifying policies to allow redirection to the call feature zone on communications from the call feature zone to the inter-provider zone;
    specifying policies to allow redirection to the media gateway zone on communications from the inter-provider zone to the call feature zone;
    specifying policies to allow redirection to the Internet/customer network zone and/or the call feature zone on communications from the inter-provider zone to the media gateway zone; and
    specifying policies to allow redirection to the media gateway zone on communications from the media gateway zone to the inter-provider zone.

4. The method of claim 1, wherein blocking communications comprises:
    locating a network security device in the communication network based on the logical division of the communication network and the policies that define allowable communications between elements in different ones of the plurality of zones.

5. A voice over Internet Protocol (VoIP) network, comprising:
    means for logically dividing the (VoIP) network into a plurality of zones;
    means for specifying policies that define allowable communications between elements in different ones of the plurality of zones; and
    means for blocking communications between elements in different ones of the plurality of zones that violate at least one of the policies;
    wherein the plurality of zones comprises an inter-provider zone, a phone registration/management zone, a call feature zone, a media gateway zone, and an Internet/customer network zone;
    wherein the means for specifying policies comprises:
        means for specifying a protocol to be used for communication between elements in the different ones of the plurality of zones; and
        means for specifying any zones to which an element may redirect a communication if the protocol is a Media Gateway Control Protocol (MGCP) or a Session Initiation Protocol (SIP).

6. The communication network of claim 5, wherein the means for specifying the policies comprises:
    means for specifying policies to allow direct communications between elements in the phone registration/management zone and the call feature zone, inter-provider zone, and Internet/customer network zone; and
    means for specifying policies to allow direct communications between elements in the inter-provider zone and the call feature zone and the media gateway zone.

7. The communication network of claim 6, wherein the means for specifying the policies comprises:
    means for specifying policies to allow redirection to the media gateway zone on communications from the inter-provider zone to the phone registration/management zone;
    means for specifying policies to allow redirection to the Internet/customer network zone and/or the call feature zone on communications from the phone registration/management zone to the inter-provider zone;
    means for specifying policies to allow redirection to the Internet/customer network zone, media gateway zone, and/or call feature zone on communications from the phone registration/management zone to the Internet/customer network zone;

means for specifying policies to allow redirection to the Internet/customer network zone on communications from the Internet/customer network zone to the phone registration/management zone;

means for specifying policies to allow redirection to the Internet/customer network zone and/or media gateway zone on communications from the phone registration/management zone to the call feature zone;

means for specifying policies to allow redirection to the call feature zone on communications from the call feature zone to the phone registration/management zone;

means for specifying policies to allow redirection to the call feature zone on communications from the call feature zone to the inter-provider zone;

means for specifying policies to allow redirection to the media gateway zone on communications from the inter-provider zone to the call feature zone;

means for specifying policies to allow redirection to the Internet/customer network zone and/or the call feature zone on communications from the inter-provider zone to the media gateway zone; and means for specifying policies to allow redirection to the media gateway zone on communications from the media gateway zone to the inter-provider zone.

8. The communication network of claim 5, wherein the means for blocking communications comprises:
   means for locating a network security device in the communication network based on the logical division of the communication network and the policies that define allowable communications between elements in different ones of the plurality of zones.

9. A computer program product for operating a voice over Internet Protocol (VoIP) network, comprising:
   a computer readable storage medium having computer readable program code embodied therein, the computer readable program code comprising:
   computer readable program code configured to logically divide the (VoIP) network into a plurality of zones;
   computer readable program code configured to specify policies that define allowable communications between elements in different ones of the plurality of zones; and
   computer readable program code configured to block communications between elements in different ones of the plurality of zones that violate at least one of the policies;
   wherein the plurality of zones comprises an inter-provider zone, a phone registration/management zone, a call feature zone, a media gateway zone, and an Internet/customer network zone;
   wherein the computer readable program code configured to specify policies comprises:
      computer readable program code configured to specify a protocol to be used for communication between elements in the different ones of the plurality of zones; and
      computer readable program code configured to specify any zones to which an element may redirect a communication if the protocol is a Media Gateway Control Protocol (MGCP) or a Session Initiation Protocol (SIP).

10. The computer program product of claim 9, wherein the computer readable program code configured to specify the policies comprises:
   computer readable program code configured to specify policies to allow direct communications between elements in the phone registration/management zone and the call feature zone, inter-provider zone, and Internet/customer network zone; and
   computer readable program code configured to specify policies to allow direct communications between elements in the inter-provider zone and the call feature zone and the media gateway zone.

11. The computer program product of claim 10, wherein the computer readable program code configured to specify the policies comprises:
   computer readable program code configured to specify policies to allow redirection to the media gateway zone on communications from the inter-provider zone to the phone registration/management zone;
   computer readable program code configured to specify policies to allow redirection to the Internet/customer network zone and/or the call feature zone on communications from the phone registration/management zone to the inter-provider zone;
   computer readable program code configured to specify policies to allow redirection to the Internet/customer network zone, media gateway zone, and/or call feature zone on communications from the phone registration/management zone to the Internet/customer network zone;
   computer readable program code configured to specify policies to allow redirection to the Internet/customer network zone on communications from the Internet/customer network zone to the phone registration/management zone;
   computer readable program code configured to specify policies to allow redirection to the Internet/customer network zone and/or media gateway zone on communications from the phone registration/management zone to the call feature zone;
   computer readable program code configured to specify policies to allow redirection to the call feature zone on communications from the call feature zone to the phone registration/management zone;
   computer readable program code configured to specify policies to allow redirection to the call feature zone on communications from the call feature zone to the inter-provider zone;
   computer readable program code configured to specify policies to allow redirection to the media gateway zone on communications from the inter-provider zone to the call feature zone;
   computer readable program code configured to specify policies to allow redirection to the Internet/customer network zone and/or the call feature zone on communications from the inter-provider zone to the media gateway zone; and
   computer readable program code configured to specify policies to allow redirection to the media gateway zone on communications from the media gateway zone to the inter-provider zone.

12. The computer program product of claim 9, wherein the computer readable program code configured to block communications comprises:
   computer readable program code configured to locate a network security device in the conirnunication network based on the logical division of the communication network and the policies that define allowable communications between elements in different ones of the plurality of zones.

* * * * *

UNITED STATES PATENT AND TRADEMARK OFFICE
CERTIFICATE OF CORRECTION

| | | |
|---|---|---|
| PATENT NO. | : 7,466,714 B2 | |
| APPLICATION NO. | : 11/006870 | |
| DATED | : December 16, 2008 | |
| INVENTOR(S) | : Stricklin et al. | |

It is certified that error appears in the above-identified patent and that said Letters Patent is hereby corrected as shown below:

In the Claims:

Column 10, Claim 12, Line 60: Please correct "device in the conirnunication"
　　　　　　　　　　　　　　　　To read -- device in the communication --

Signed and Sealed this

Seventeenth Day of February, 2009

JOHN DOLL
*Acting Director of the United States Patent and Trademark Office*